United States Patent Office 3,285,906
Patented Nov. 15, 1966

3,285,906
MONOAZO PYRAZOLE DYES
Wilbur H. Kretlow, Oak Park, and Jerome L. Mostek, Niles, Ill., and James S. Dwyer, Lafayette, Ind., assignors to Stange Co., a corporation of Illinois
No Drawing. Filed Feb. 3, 1964, Ser. No. 342,286
2 Claims. (Cl. 260—162)

This application is a continuation-in-part of copending application Serial No. 454,639, entitled, "Food Coloring Composition," filed September 7, 1954, now abandoned.

This invention relates to new and useful dye compositions and more particularly to a dye containing a sulfonated benzene and naphthalene ring particularly suitable for the production of colored food products such as meat casings.

Orange dyes are required or desired for use in coloring or dyeing applications, e.g. in the food preparation industry. It is particularly desirable, for example, to use an orange dye in coloring meat casings.

In the past, meat casings have been colored by using dyes containing FD & C Orange No. 1. Recently, the U.S. Food and Drug Administration voiced disapproval of this dye as a satisfactory coloring material for foods and FD & C Orange No. 1 was removed from the listing of acceptable food coloring matters, leaving no really complete substitute.

A general object of this invention is to provide a new and useful orange dye material.

An important object of this invention is to provide a non-toxic dye that is capable of producing a desired orange color in meat casings when incorporated therein.

Another object of this invention is the production of an orange synthetic dye which may be blended with certain of the FD & C red dyes to produce multiple orange shades.

A further object of this invention is the production of synthetic dye that may be applied to meat casings and which is non-toxic when administered orally or ingested.

Other objects may be apparent to those in the art from the disclosure given herein.

The new and useful orange dye of this invention has the following structural formula:

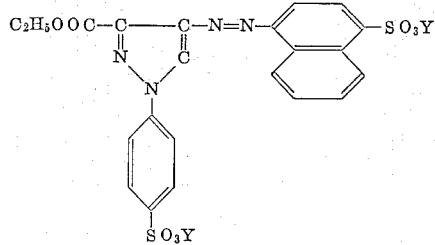

wherein Y is an alkali cation selected from the class consisting of alkali metals, e.g. sodium and potassium, and ammonium.

Other cationic groups may also be useful in the Y position without material affect on the dye color. In general, any of the other members of the group commonly known as alkali metals, i.e. other than sodium and potassium, may be used in lieu of sodium, potassium and ammonium as the group designated by Y in the above formula and the compound is still an orange dye.

It is preferred, however, because of their non-toxicity, to use sodium, potassium or ammonium, and especially sodium, for this purpose, since the dye is intended for use in, or in contact with, an edible food product. In use of the dye hereof, a desired orange color may be produced in meat casings by incorporating the dye therein.

The $C_2H_5$— group in the formula may be replaced by other alkyl or substituted alkyl groups if desired; however, we prefer the ethyl group because we have found that the dye containing such group has excellent retention properties. Thus, the most desirable dyes for the purposes herein are the sodium, potassium and ammonium salts, and preferably, the disodium salt of 3-ethyl carboxy - 5 - hydroxy - 1 - p - sulfophenyl - 4 - (4 - sulfo-1-napthylazo) pyrazole. The disodium salt has a molecular weight of 590.28.

The dye is soluble in water and meets the requirements of the Food and Drug Administration as to tolerances governing dye content.

In powder form, the dyes hereof present a dull orange appearance. The dye spectrum in water presents an absorption peak at 442 millimicrons in .04 N ammonium acetate solution. The coloring effect of the dye is very close to Orange 1, having a yellow undertone, however, instead of red. Its tinctorial strength is approximately one-half that of Orange 1. The dye dyes wool from an acid bath a bright scarlet but does not dye cotton. Thus, the dyes hereof are useful in imparting color to wool and may also be useful in dyeing other materials.

The following is an outline of the reaction of the orange dye with various reagents:

| | |
|---|---|
| Conc. hydrochloric acid | Red. |
| Conc. sulfuric acid | Violet, on dilution becomes fuchsia then red. |
| 10% sodium hydroxide | Yellow-orange, then brownish yellow on dilution. |
| Conc. ammonium hydroxide | Same as 10% conc. sodium hydroxide. |
| Sulfur dioxide | Not affected. |
| Sodium hydrosulfite | Completely reduced. |

The dye is water soluble. For example, the solubility of the disodium salt dye in 1 liter of distilled water at 77 degrees C. is 220 grams. The solution is supersaturated on cooling, and after an elapse of eight hours the solution, at 25 degrees C., contains 22% of the disodium salt. The dye is soluble in acidified primary normal amyl alcohol, slightly soluble in acetic acid and ethyl alcohol, faintly soluble in acetone and insoluble in reagents such as ethyl ether, isopropyl ether, benzene, chloroform, phenol, camphor, dioxane, nitrobenzene, carbon tetrachloride, carbon disulfide, benzaldehyde, ethyl acetate and petroleum ether.

Exemplary of the preparation of the dyes, the disodium salt can be prepared by first reacting phenylhydrazine-p-sulfonic acid with sodium ethyl oxalacetate, i.e. 2-(sodiumoxy)-diethylmaleate, and then partially hydrolyzing with a mild alkali and coupling the resultant pyrazolone compound with diazotized napthionic acid. The involved reactions may be illustrated by the following equations:

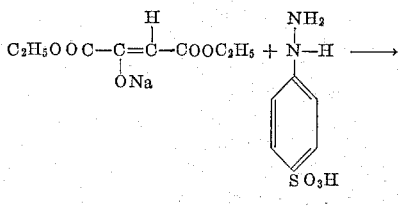

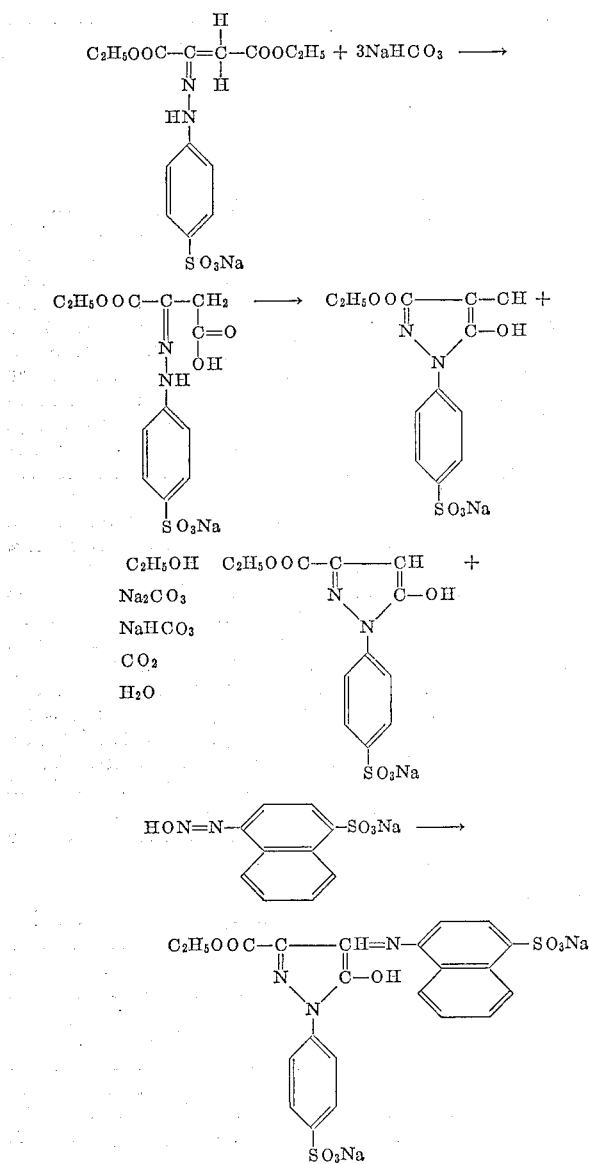

The significance of the reactions lies in the removal of only one ethyl grouping from the dye molecule. Removal of both ethyl groups by hydrolysis results in the production of a subsidiary dye unsuitable for application to meat casings because it tends to penetrate meat packed in the casings. Because of the element of control necessary to prevent the formation of undesirable dye products a detailed description of procedure followed in producing the orange dye of the invention will be outlined.

The phenylhydrazine is made into slurry with water with controlled acidity wherein the solution is acid to Congo red. The temperature is maintained at 35 to 40 degrees C., and one mole of dry sodium ethyl oxalacetate is added with stirring until condensation is completed. The ring structure is closed and one ethyl group eliminated by the addition of three molecular proportions of mild alkali. Experience has demonstrated that soda ash is too strong, causing too much causticity in the reaction. Consequently, bicarbonate of soda is employed, being more suitable because of its buffer action. Little or no subsidiary dye is formed with the bicarbonate although this form of alkali is more difficult to work with because of the formation of a fine slow-breaking foam.

The temperature is brought to 55 to 60 degrees C., and the solution stirred for one half hour subsequent to gas evolution. Control of the resultant pyrazolone ester should be exercised to prevent hydrolysis of the remaining ester group and the production of the pyrazolone carboxylic acid with subsequent products of a subsidiary dye. Hydrolysis will occur rapidly with high temperature and the alkali liberated in the reactions.

A molecular proportion of sodium naphthionate, diazotized and cooled to 5 degrees C. or lower is added to the pyrazolone ester for coupling purposes in an iced medium. The resulting temperature should be below 15 degrees C. The solution is stirred for two hours and salted out at a pH of 8.0 and preferably at a temperature of 20 to 25 degrees C. Stirring of the mixture as salting out begins is necessary to avoid the formation of a colloidal solution with attendant filtering difficulties.

The resultant crude is filtered, washed and added to water having a temperature of 45–50 degrees C. The temperature during addition of the crude is maintained within the outlined temperature range to avoid the problem of hydrolysis arising from the presence of alkalies augmented by higher temperatures. The dye thus formed is purified, filtered, pressed and dried in vacuum.

The yield obtained in pilot batches is upwards of 66% and the dye content after purification is approximately 93%.

The subsidiary dye which may be formed through hydrolysis of both ester linkages, as described above, is structurally similar to the desired orange dye product, but is yellower in color in solution, much more soluble (particularly in the presence of salt), and is much more strongly adsorbed in a chromatographic column where its presence may be detected. The desired orange dye product of the invention will move down the column considerably faster than the subsidiary dye.

Spectrophotometric curves of the desired orange dye and the subsidiary dye differ considerably with peaks approximately eleven millimicrons apart, thus making detection quite easy in the presence of each other. The percentage of the subsidiary dye present can be determined e.g., for assay purposes, by analysis of the spectrophotometric curves.

Extensive pharmacological testing of the disodium salt dye of this invention indicates that no element of toxicity occurs when normal amounts of the dye are used in feed rations. Chronic feeding tests involving diet concentrations of the dye up to 5% indicate non-toxicity of the dye when administered orally to animals subjected to the testing program. Such tests were conducted with rats fed control diets containing no dye. Even with the highest concentration (5%) of the dye employed in these studies, there was little or no effect on the growth rate or food consumption of rats when compared with the animals fed control diets.

The dye produced is unlike the various known toxic dyes in that the benzene and naphthalene rings have been sulfonated. The toxic effect of the aromatic material in the dye has been reduced by conjugating the benzene rings with sulfuric acid. It is thought that the material when eaten remains as sulfonated benzene rings in vivo. The dye provided hereby is of a naure suitable for certification by the Food and Drug Administration as a food coloring material.

The dye may be used to impart color to any of the meat casings commonly used, such as viscose type casings, natural hog and natural sheep casings. In manufacturing sausage products, the dye is applied in accordance with accepted practices. In typical sausage manufacture, subsequent to filling of the casing, the product is subjected to a combination of smoking and cooking at elevated temperatures. Thereafter the product may be additionally cooked or may be merely subjected to a dye bath. By way of example of sausage dyeing technique, a tank having a capacity of 160 gallons is substantially filled with a mixture of water and 16 ounces of dye. As a departure from usual dyeing operations, we facilitate coloring by providing an acid medium. To this end 1 to 2 quarts of household vinegar are added to each 100 gallons of the dye mixture, the amount being determined by the alkalinity of the water used. The acid dye mixture fixes the color and causes more color to adhere to the casings. The temperature of the dye bath is maintained at 160° F. and the meat product is immersed therein for 7½ to 15 minutes, depending upon the depth of dye desired. The intensity of the color achieved will also be determined, of course, by the amount of dye provided in the dye bath.

Since desirable color intensity varies with different markets, it can be appreciated that a wide variety of meat product demands may be met by adjusting the amount of dye employed as well as regulating the length of the dye bath.

We have also found that the dye provided may be used in combination with non-penetrating FD & C colors to produce multiple orange shades. Variation of color is desirable to meet consumer aesthetic requirements and enhances eye appeal of the dyed product. The amount and choice of color is dependent upon factors of geographic location, method of coloring and the type of purchasing public served. FD & C Red No. 2 [trisodium salt of 1-(4-sulfo-1-naphthylazo) - 2 - naphthol-3,6-disulfonic acid] and FD & C Red No. 4 [disodium salt of 2-(5-sulfo-2,4-xylylazo)-1-naphthol-4-sulfonic acid] are exemplary of dyes suitable for use in combination with the orange dye of this invention.

The dye described herein is an orange dye having a sulfonated benzene ring combined with other intermediates. In use, the dye is capable of use in producing suitable and variable orange color hues. The dye is capable of production as a dye which is non-toxic when ingested and will adhere to meat casing when applied thereto without penetrating the meat substance housed therein. The outlined disclosure is by no means exhaustive, but is deemed sufficient to teach those skilled in the art the manner in which our invention may be practiced. Thus, although a specific form of the dye hereof has been described in detail, as has its use, such description is merely illustrative of the invention and is not intended to limit the invention.

The disodium salt of 3-ethyl carboxy-5-hydroxy-1-p-sulfophenyl-4-(4-sulfo-1-naphthylazo) pyrazole may be termed 3-ethyl carboxy-5-hydroxy-1-p-sodiumsulfophenyl-4-(4-sodiumsulfo-1-naphthylazo) pyrazole. In accordance with such terminology, specific examples of other useful orange dye compounds are: 3-ethyl carboxy-5-hydroxy-1-p-potassiumsulfophenyl - 4 - (4-potassiumsulfo-1-naphthylazo) pyrazole, 3-ethyl carboxy-5-hydroxy-1-p-ammoniumsulfophenyl - 4 - (ammoniumsulfo-1-naphthylazo) pyrazole, 3-ethyl carboxy-5-hydroxy-1-p-sodiumsulfophenyl-4-(4-potassiumsulfo-1-naphthylazo) pyrazole, etc. Preparation of such salts will be apparent from the foregoing example of preparation of the disodium salt.

We claim:
1. An orange dye having the formula:

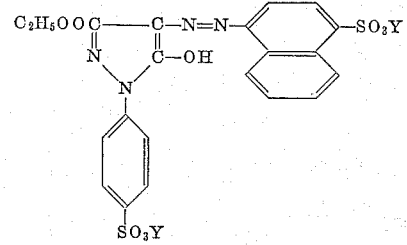

wherein Y is selected from the class consisting of sodium, potassium and ammonium.

2. An orange dye having the formula:

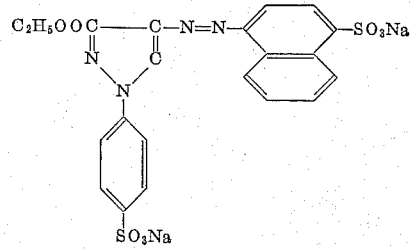

References Cited by the Examiner
UNITED STATES PATENTS

| | | | |
|---|---|---|---|
| 2,199,043 | 4/1940 | Conzetti | 260—162 |
| 2,330,828 | 10/1943 | Lubowe et al. | 260—163 |
| 2,384,734 | 9/1945 | Felix et al. | 8—26 |
| 2,435,182 | 1/1948 | Long | 260—162 |
| 2,457,823 | 1/1949 | Kendall et al. | 260—162 |
| 2,477,767 | 8/1949 | Remer | 99—176 |
| 2,477,768 | 8/1949 | Remer | 99—176 |
| 2,610,103 | 9/1952 | Widmer et al. | 8—26 |

CHARLES B. PARKER, *Primary Examiner.*

D. M. PAPUGA, *Assistant Examiner.*